United States Patent [19]

Schröder et al.

[11] Patent Number: 4,709,752
[45] Date of Patent: Dec. 1, 1987

[54] COOLING ARRANGEMENT FOR HEAT GENERATING ELECTRICAL COMPONENTS

[75] Inventors: Johann Schröder; Klaus Gawron, both of Aachen; Leo Bertram, Stolberg, all of Fed. Rep. of Germany; Hugo Schemmann, Schaesberg, Netherlands

[73] Assignee: U.S. Philips Corporation, New York, N.Y.

[21] Appl. No.: 879,728

[22] Filed: Jun. 27, 1986

[30] Foreign Application Priority Data

Jul. 6, 1985 [DE] Fed. Rep. of Germany ....... 3524242

[51] Int. Cl.$^4$ .............................................. H02K 9/00
[52] U.S. Cl. ..................................... 165/47; 165/902; 310/47; 310/52; 310/57; 310/89
[58] Field of Search ................... 165/902, 10, 47; 310/47, 52, 57, 89

[56] References Cited

U.S. PATENT DOCUMENTS

| | | | |
|---|---|---|---|
| 907,099 | 12/1908 | Trowbridge | 165/902 |
| 3,565,167 | 2/1971 | Eder | 165/47 |
| 3,780,356 | 12/1973 | Leing | 165/47 |

FOREIGN PATENT DOCUMENTS 1054473 4/1959 Fed. Rep. of Germany ........ 165/47

*Primary Examiner*—Albert W. Davis, Jr.
*Attorney, Agent, or Firm*—Thomas A. Briody; William J. Streeter; Rolf E. Schneider

[57] ABSTRACT

A protection against overheating not only of the heat transmitting component (2), but also of the components (3) surrounding said component is achieved. A latent heat store (1) is provided between the heat transmitting component (2) or a part thereof and a component (3) to be protected from overheating or a part thereof. The latent heat store (1) comprises a latent heat storing agent, whose melting-point T is between the operating temperature of the heat transmitting component (2) and the maximum permissible temperature of the component (3) to be protected. The quantity is proportioned so that the storage capacity of the latent heat store (1) is sufficient for the amount of heat maximally to be transmitted by the heat transmitting component (2). Between the heat transmitting component (2) and the latent heat source (1) and between the latent heat store (1) and the component (3) to be protected a thermal insulation (4,5) is provided. The melting-point T of the latent heat storing agent and the thicknesses d of the insulations (4,5) are proportioned so that the temperature gradient $\Delta T/d$ from the heat transmitting component (2) which is at operating temperature to the latent heat store (1) is greater than the temperature gradient $\Delta T/d$ from the latent heat store (1) to the component (3) to be protected.

9 Claims, 1 Drawing Figure

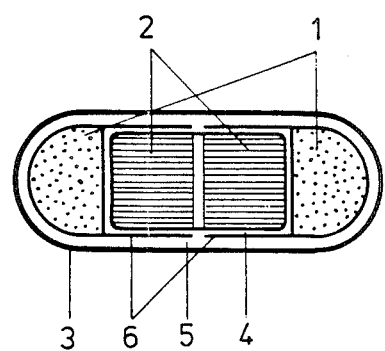

COOLING ARRANGEMENT FOR HEAT GENERATING ELECTRICAL COMPONENTS

The invention relates to a cooling arrangement for heat generating or transmitting electrical components having a latent heat store.

Like electrical resistors, other electrical components, for example, diodes, transistors and thyristors, and electric motors, may experience a more or less strong heating upon current passage. With a correspondingly high load this may lead to a rise in temperature which results in a premature ageing and destruction of the components. It must hence be ensured that the heat transmission from the component to the atmosphere is sufficiently large to dissipate the thermal energy resulting from electric losses (hereinafter referred to as dissipated heat) and to avoid critical rises in temperature.

It is known from DE-PS 20 03 393, AT-PS 310 811 and U.S. Pat. No. 40 57 101 to keep electrical components at a temperature which is optimal for their operation or to protect them from temporarily limited thermal overload by bringing them in direct thermal contact with a latent heat store in direct thermal contact with cooling pins or radiators.

However, cases also occur in which the electrical component in which the dissipated heat is produced can withstand the occurring temperatures without damage or whose function is even improved by said temperatures. The components surrounding the component must, however, be protected from a heating above a certain temperature. The components to be protected include, for example, other electrical components, for example, capacitors, but also mechanical components, for example, driving shafts or structural components, for example housings of electric apparatuses.

SUMMARY OF THE INVENTION

It is the object of the invention to protect from overheating not only the heat transmitting electrical component itself but also and first of all the components surrounding the heat transmitting component.

According to the invention this object is achieved in that in a cooling arrangement of the type having a latent heat store is provided between the heat generating or transmitting component or a part thereof and a component or a part thereof to be protected from overheating. The latent heat store comprises a latent heat storing agent whose melting-point T is between the operating temperature of the heat transmitting component and the maximum permissible temperature of the component to be protected. The quantity of the heat storing agent is proportioned so that the storage capacity of the latent heat store is sufficient for the amount of heat maximally to be transmitted by the heat transmitting component. Between the heat transmitting component and the latent heat store, and between the latent heat store and the component to be protected a thermal insulation is provided. The melting-point T of the latent heat storing agent and the thicknesses d of the insulations are proportioned so that the temperature gradient $\Delta T/d$ from the heat transmitting component which is at the operating temperature to the latent heat store is larger than the temperature gradient $\Delta T/d$ from the latent heat store to the component to be protected.

The invention is hence based on the idea of providing between the heat transmitting component and the components surrounding the same a latent heat store which is thermally insulated therefrom and whose melting temperature is between the temperature of the heat transmitting component and the maximally permissible temperature of the components to be protected. Melting point and insulation should be proportioned so that the temperature gradient from the hot electrical component to the store in principle is larger than the temperature gradient from the store to the components to be protected.

The latent heat store absorbs the excessive part of the dissipated heat as melt enthalpy when the latent heat storing agent is melted, and so the temperature is limited to the melting point of the latent heat storing agent. A storing agent should hence be chosen which has a melt enthalpy per unit by volume and weight which is as high as possible and a melting point matching the required temperature limit. Salt hydrates or hydroxide hydrates are particularly suitable for this purpose.

The quantity of storing agent must be proportioned so that the storage capacity is sufficient for the maximally occurring dissipated heat. In the operating pauses or periods of low thermal load the thermal energy absorbed by the store is dissipated to the ambient.

For structural reasons it is advantageous in many cases to construct the latent heat store so as to consist of several parts.

For the same reasons it is advantageous in the same or in other gases to provide the latent heat store only between a part of the heat transmitting component and/or only a part of the component to be protected from overheating. In these cases it is advantageous to provide heat conductors which are in thermal contact with the latent heat store between the two thermal insulations in those places in which no latent heat store is present

DESCRIPTION OF THE FIGURES

An embodiment of the invention is shown in a drawing and will be explained in greater detail hereinafter. The sole FIGURE of the drawing is a diagrammatic representation of an electric shaving apparatus.

DESCRIPTION OF THE PREFERRED EMBODIMENT

The electric shaving apparatus is very suitable to illustrate the simple and effective cooling arrangement according to the invention in a practical example since normally it is operated in short operating phases with comparatively long intermediate quiescent periods. Moreover it should be as light, small and handy as possible. Therefore, a powerful synchronous motor is particularly suitable as a drive.

In spite of the comparatively high efficiency, such a synchronous motor still has a power dissipation of 5 to 10 watts which, converted into thermal energy, heats the motor to temperatures of approximately 100° to 140° C. under the thermal conditions given in a small housing of a shaving apparatus. Such temperatures are not critical for the motor but since, as is required, the surface of the housing and the wall distance to the motor are comparatively small, the wall of the housing would be heated by the hot motor at temperatures above 40°, which of course is not acceptable since it would be very unpleasant to touch.

For cooling the wall of the housing a flat latent heat store could be integrated in the wall. In order that the wall cannot become warmer than 40° C. the storing agent in this case must have a melting point below 40° C. The serious disadvantage of a melting temperature which is so close to the ambient temperature is that the regeneration time, i.e. the time in which the absorbed thermal energy is again transmitted to the atmosphere, is very long and that on hot summer days the regeneration cannot occur at all.

On the other hand, as is known, the motor could be cooled and its temperature be reduced in that it is brought in direct thermal contact with a latent heat store. A disadvantage of lowering the motor temperature, however, is that the thermal capacity is also reduced to the same extent. Moreover, when the operating time is too long and overload of the store determined thereby occurs, the possibility exists that the motor temperature and hence also the storage temperature rise to above 140° C. When salt hydrates or hydroxide hydrates are used as storing agents which are preferred due to their high melting heat, decomposition pressures above atmospheric pressure could occur which would destroy the storage apparatus.

It is hence much better and much more reliable both as regards the temperature limit of the wall of the housing below 40° C. and as regards a regeneration time which is as short as possible to proceed according to the present invention as follows as is shown in the FIGURE.

A latent heat store 1 is filled with a storing agent whose melting point T is between the operating temperature of a motor 2 and the maximally permissible wall temperature of a housing 3 (40° C.). The store 1 is then provided between the motor 2 and the wall 3 of the housing and thermally insulated from both of them in such a manner that the temperature gradient $\Delta T/d$ and hence the heat flow in an insulation layer 4 facing the motor is always larger than in an insulation layer 5 facing the housing. In this manner the thermal energy hence flows from the motor, first with high density, to the store and is accumulated there at constant melting temperature, and hence with greater density, i.e. over a longer period of time, and is finally transmitted to the wall of the housing and further to the ambient air. In this manner the wall of the housing is thermally loaded less and its temperature remains below the required limit of 40° C.

The wall 3 of the housing consists of a synthetic resin or of metal. The insulating layers 4 and 5 consist, for example, of air. The walls of the latent heat store 1 consist, for example, of synthetic resin or of metallic materials which are chemically resistant against the storing agent, for example, nickel or chromium nickel steels.

In order that the construction of the shaving apparatus can be kept as flat as possible, two latent heat stores in this example are provided at both sides of the motor. The thermal energy is guided from the upper and lower sides of the motor into the stores by conductive sheets 6 of aluminium or copper which are in thermal contact with the stores and are 0.9 mm thick.

Without stores and conductive sheets an operating temperature of approximately 140° C. adjusts in a few minutes at the motor and with an insulating air layer of 2 mm thickness the temperature of the wall of the housing increases to approximately 50° C. So the temperature gradient is 90/2=45°/mm.

With heat store and conductive sheets the motor temperature rises to nearly 135° C. The store which surrounds the motor with its conductive sheets at a distance of 0.5 mm is filled with sodium acetate-trihydrate $CH_3COONa.3H_2O$ whose melting point is at 58° C. The temperature gradient between the motor and the conductive sheets hence is approximately 75/0.5=150°/mm and produces a very powerful heat flow to the store which absorbs it latently as heat of fusion and keeps its temperature constant at 58° C. until all the salt has melted. Between the conductive sheets and the wall of the housing which is 1.5 mm away the temperature gradient hence is only approximately 30/1.5=20°/mm. Therefore, only comparatively little thermal energy flows to the wall whose temperature of approximately 30° C. hence remains clearly below the required limit of 40° C.

As storing agents are suitable, for example, for this special purpose in addition to $CH_3COONa.3H_2O$, melting-point 58° C., heat of fusion 289 $kJ/dm^3$ also $NaOH.H_2O$ eutect., melting-point 61° C., heat of fusion 336 $kJ/dm^3$ $NaOH.H_2O$ congr., melting-point 64° C., heat of fusion 378 $kJ/dm^3$ $CaCl_2.6H_2O$ melting-point 30° C., heat of fusion 284 $kJ/dm^3$.

The cooling arrangement according to the invention can be incorporated not only in electric shavers but also in other electric apparatuses, for example, vacuum-cleaners, kitchen machines or wind screen wipers drives.

What is claimed is:

1. A cooling arrangement for heat generating electrical components comprising:

a latent heat store between the heat generating component and a component to be protected from overheating, the latent heat store comprising a latent heat storing agent whose melting-point T is between the operating temperature of the heat generating component and the maximum permissible temperature of the component to be protected, the quantity of said storing agent is proportioned so that the storage capacity of the latent heat store is sufficient for the amount of maximum heat generated by the heat generating component, between the heat transmitting component and the latent heat store and between the latent heat store and the component to be protected, a thermal insulation is provided, and the melting-point T of the latent heat storing agent and the thicknesses d of the respective insulations between said heat transmitting component and store, and store and component to be protected are proportioned so that the temperature gradient $\Delta T/d$ from the heat generating component, which is at the operating temperature, to the latent heat store is greater than the temperature gradient $\Delta T/d$ from the latent heat store to the component to be protected.

2. A cooling arrangement as claimed in claim 1, wherein the latent heat store comprises a salt hydrate or a hydroxide hydrate as a latent heat storing agent.

3. A cooling arrangement as claimed in claim 1, wherein the latent heat store is composed of several parts.

4. A cooling arrangement as claimed in claim 1, in which the latent heat store is provided between a part of the heat generating component and a part of the component to be protected from overheating, and heat conducting devices which are in thermal contact with the latent heat store are provided between the two thermal insulations in those places in which no latent heat store is present.

5. A cooling arrangement as claimed in claim 1 incorporated in an electric apparatus in which the heat transmitting component is an electric motor and the component to be protected from overheating is a wall of a housing.

6. A cooling arrangement as claimed in claim 5, incorporated in an electric shaving apparatus.

7. A cooling arrangement as claimed in claim 6, wherein the latent heat storing agent comprises $CH_3COONa.3H_2O$ or $NaOh.H_2O$ eutect. or congr., or $CaCl_2.6H_2O$.

8. An appliance structure for containing a heat generating motor comprising:

a conductive sheet surrounding a heat generating electrical motor and spaced apart therefrom at a first distance forming an insulating barrier with said electrical component;

a latent heat store in contact with a portion of said conductive sheet, said heat store including a heat storing agent; and an exterior wall spaced apart from said conductive sheet and said heat store a second distance greater than said first distance, forming a second insulating barrier having a temperature gradient smaller than a temperature gradient of said first insulating barrier, whereby said exterior wall is maintained at a temperature below a required handling limit while said motor temperature is maintained at a higher operating temperature.

9. The structure of claim 8 comprising a second latent heat store in contact with a second portion of said conductive sheet.

* * * * *